Aug. 7, 1951  C. R. CROSON  2,563,214
PIPE MAKING MACHINE
Filed Feb. 14, 1946  10 Sheets-Sheet 3
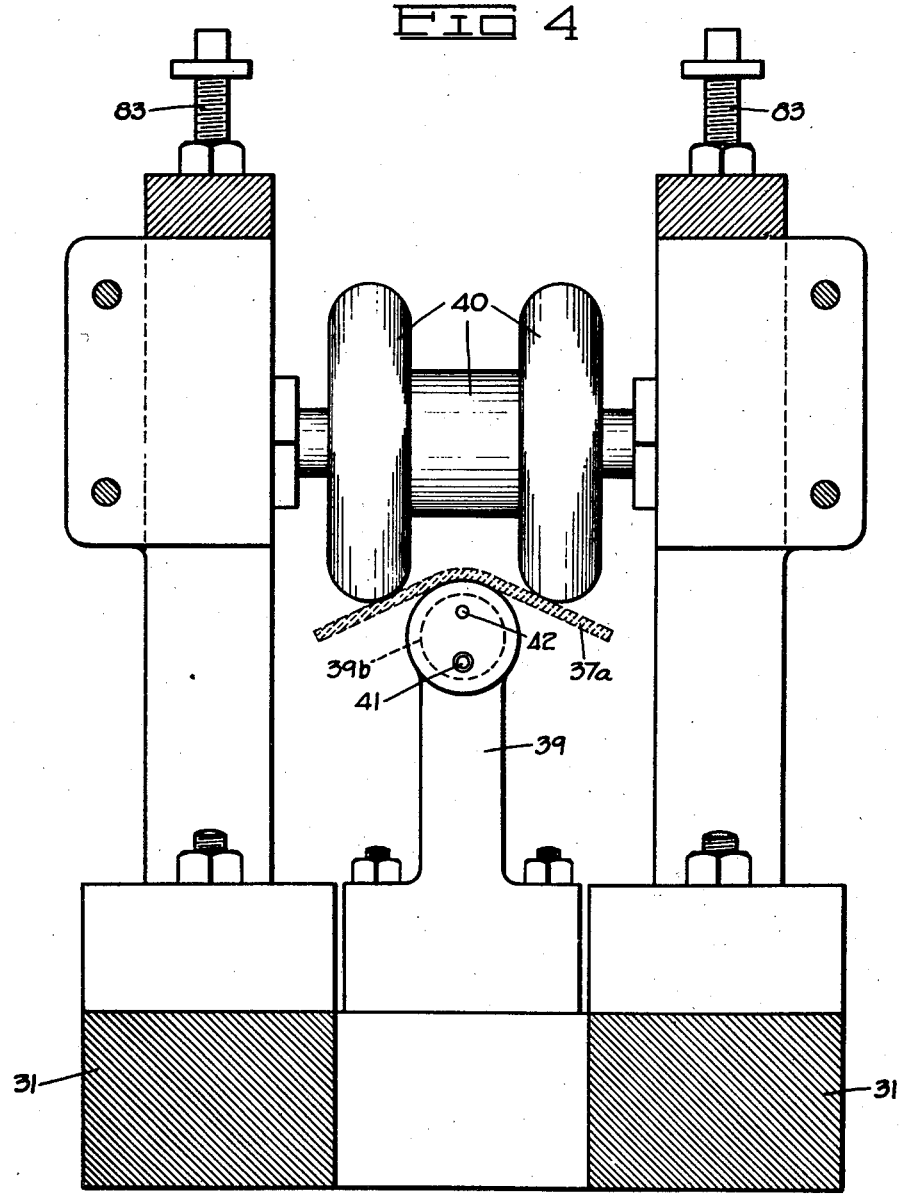
INVENTOR
Clyde R. Croson
BY W. F. Keefer
ATTORNEY

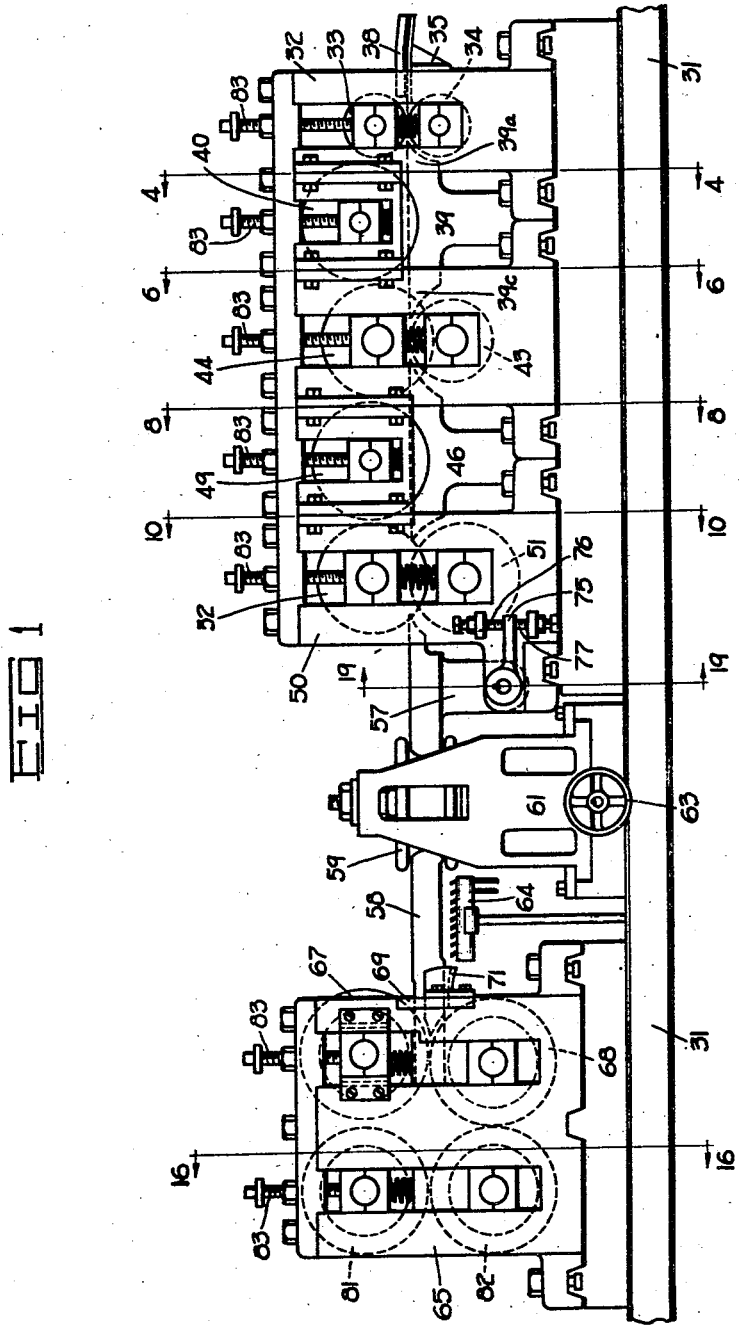

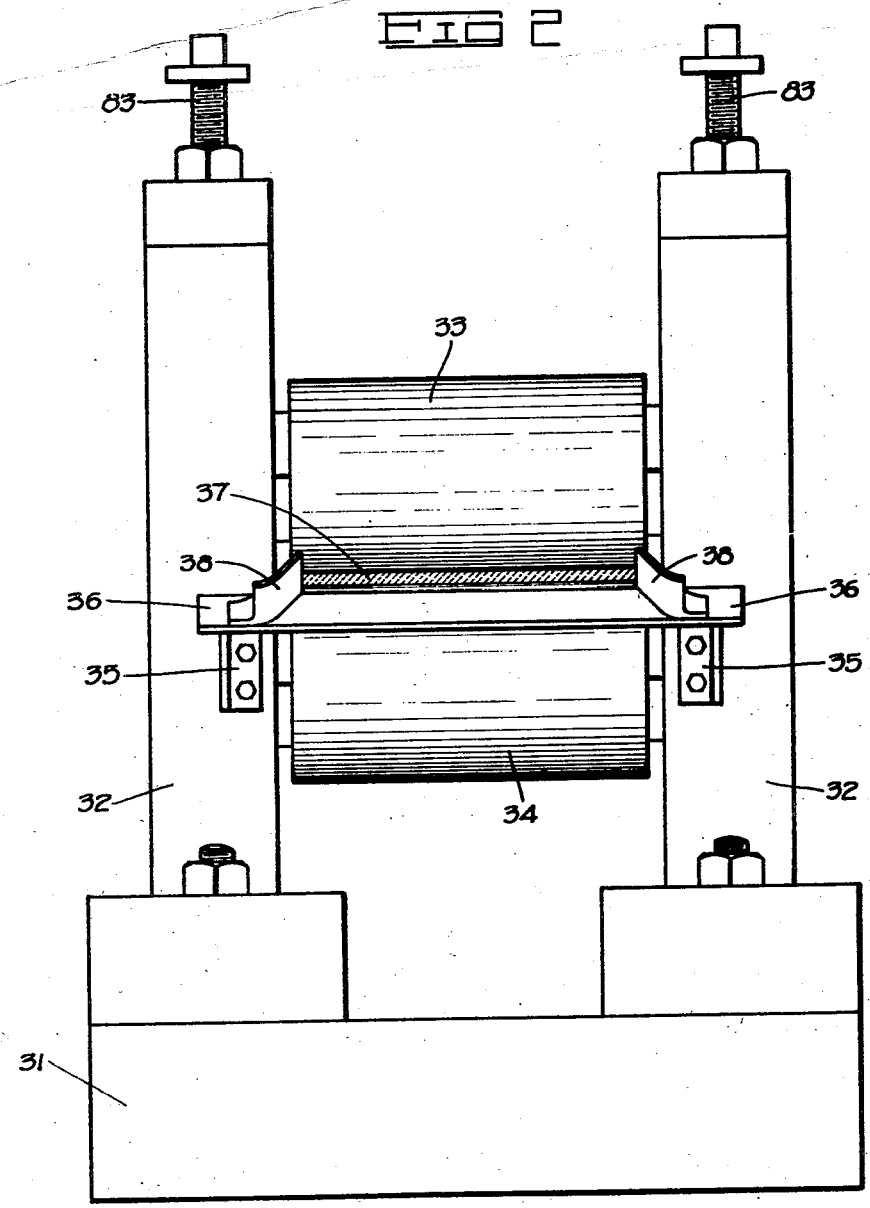

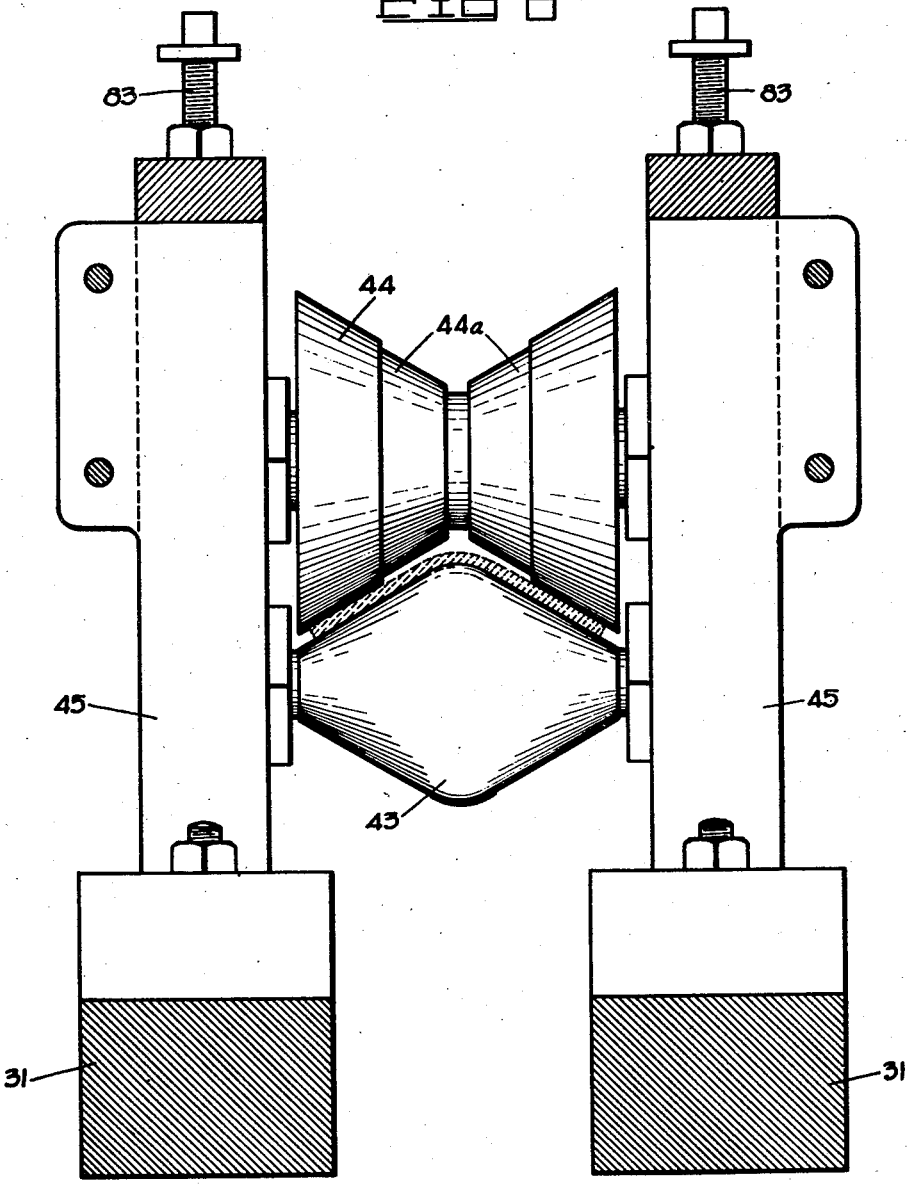
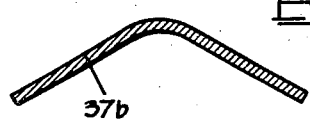

Aug. 7, 1951     C. R. CROSON     2,563,214
PIPE MAKING MACHINE
Filed Feb. 14, 1946     10 Sheets-Sheet 5
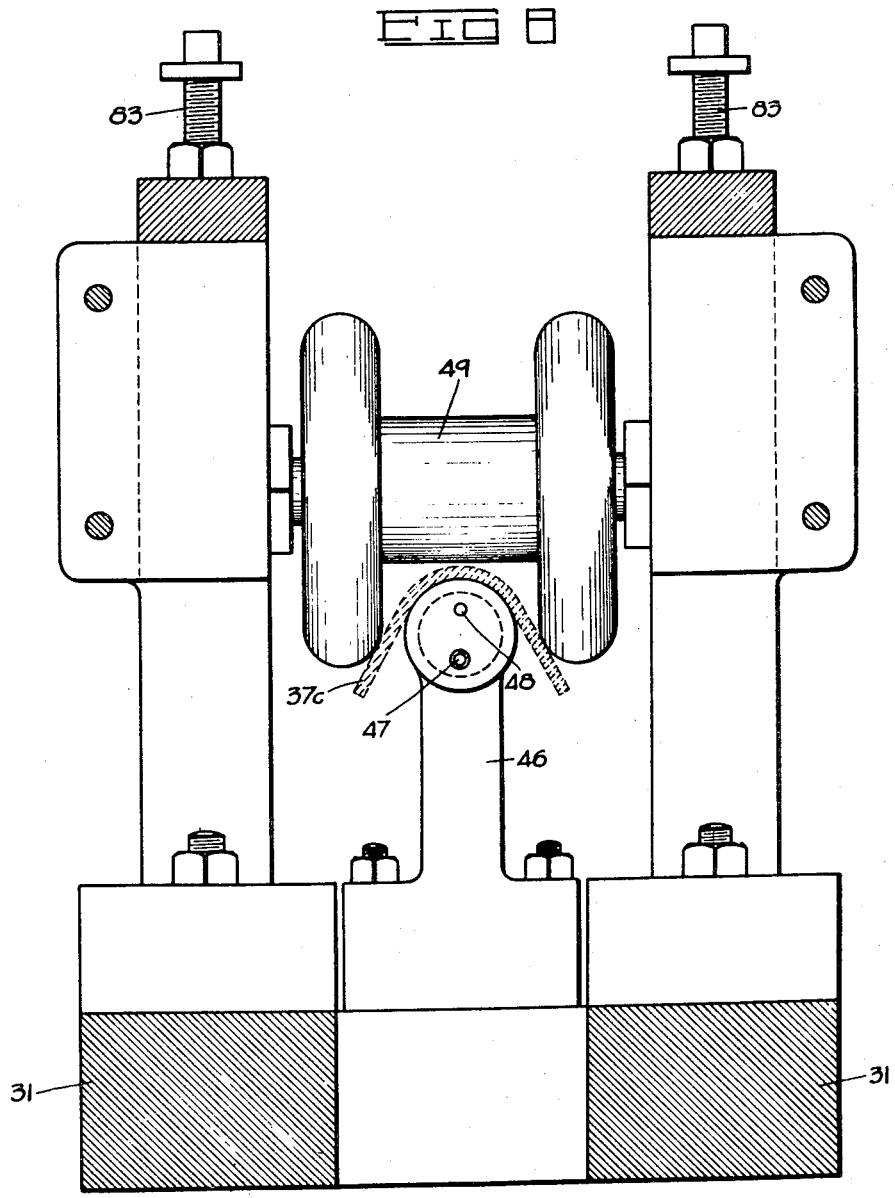
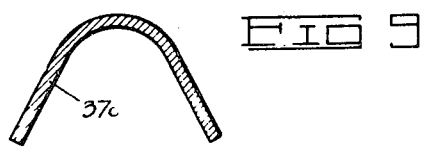
INVENTOR
Clyde R. Croson
By W. F. Keefer
ATTORNEY Aug. 7, 1951 C. R. CROSON 2,563,214
PIPE MAKING MACHINE
Filed Feb. 14, 1946 10 Sheets-Sheet 6
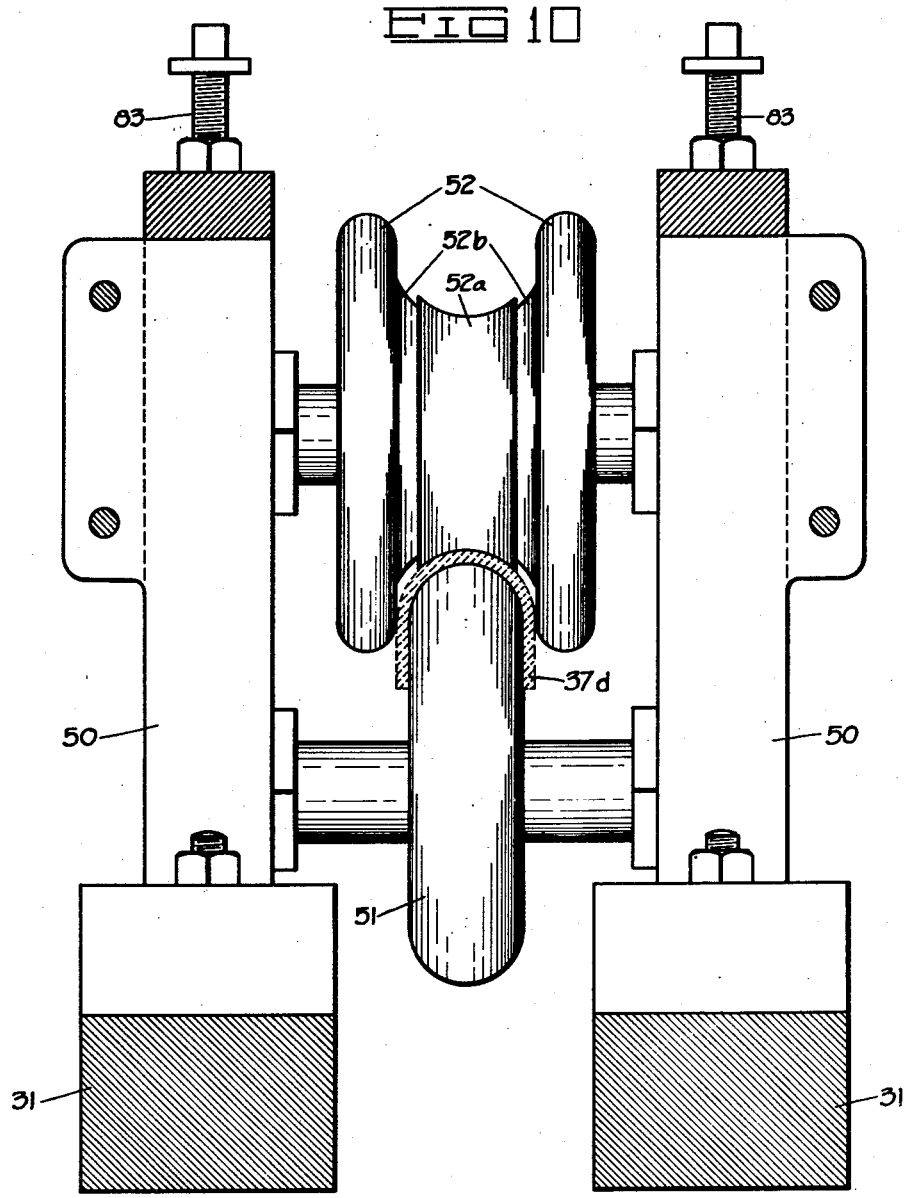
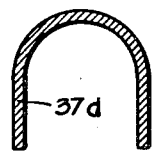
INVENTOR
Clyde R. Croson
By W. F. Keefer
ATTORNEY Aug. 7, 1951 C. R. CROSON 2,563,214
PIPE MAKING MACHINE
Filed Feb. 14, 1946 10 Sheets-Sheet 7

INVENTOR
Clyde R. Croson
BY W. F. Keefer
ATTORNEY

Aug. 7, 1951  C. R. CROSON  2,563,214
PIPE MAKING MACHINE
Filed Feb. 14, 1946  10 Sheets-Sheet 8
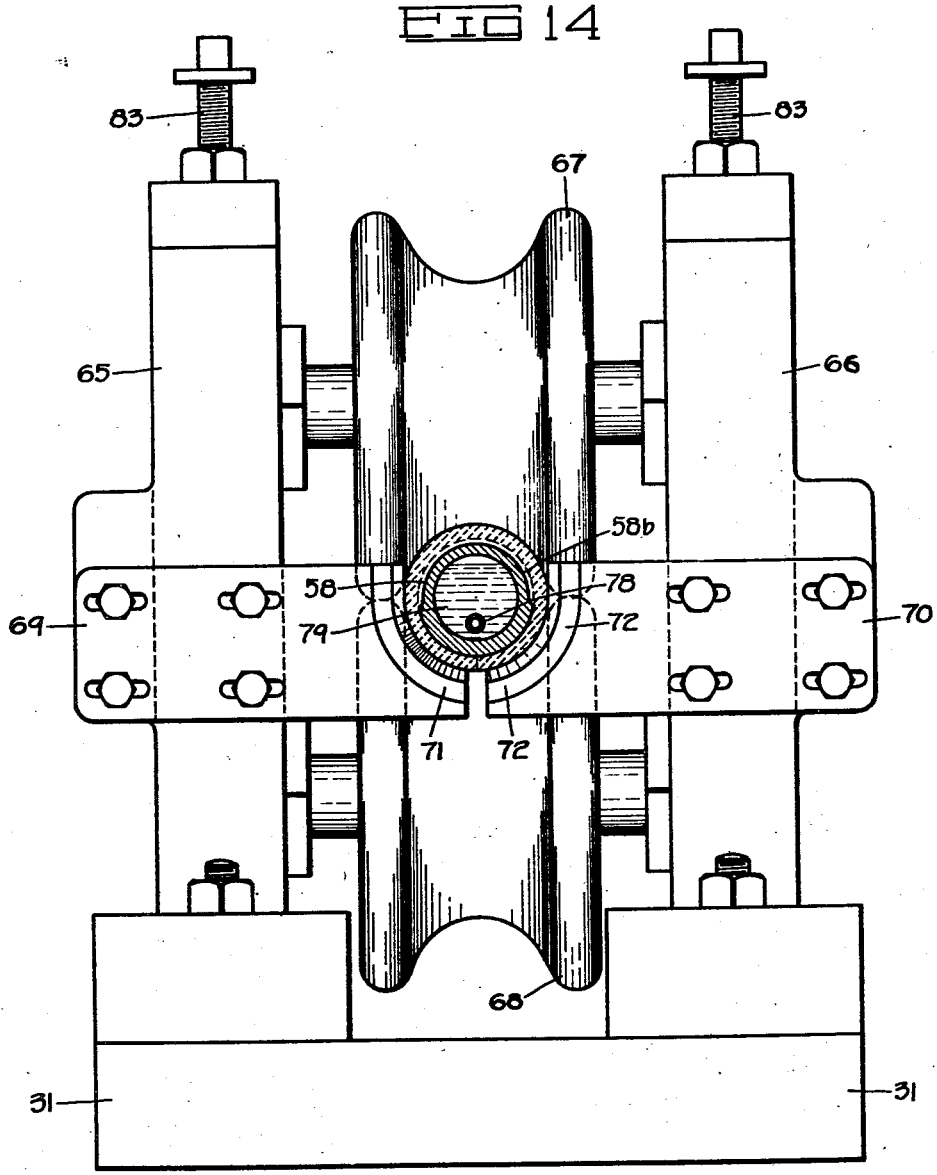
INVENTOR
Clyde R. Croson
By W. F. Keefer
ATTORNEY INVENTOR
Clyde R. Croson
BY W.F. Keefer
ATTORNEY

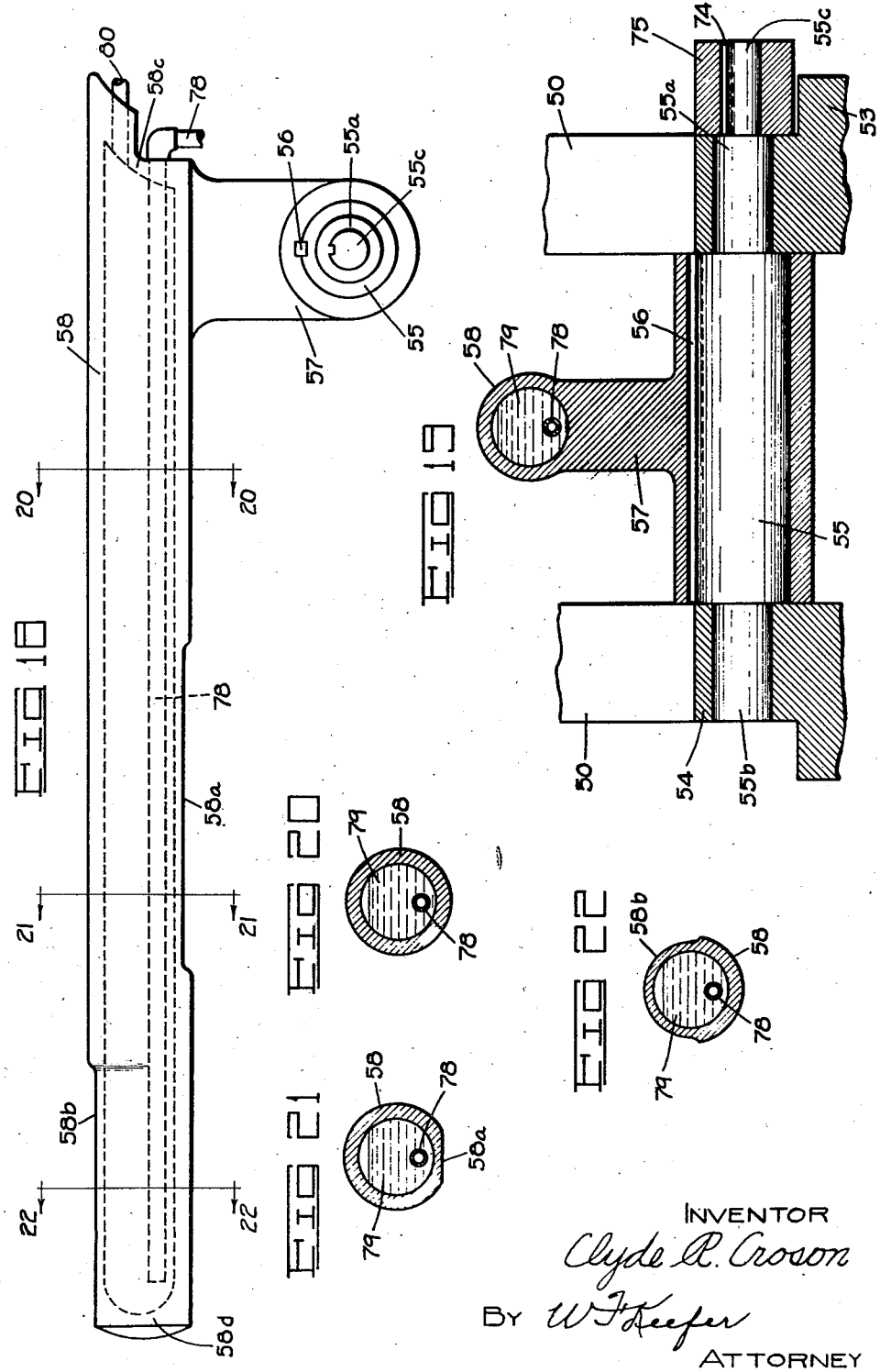

Patented Aug. 7, 1951

2,563,214

UNITED STATES PATENT OFFICE 2,563,214

PIPE-MAKING MACHINE

Clyde R. Croson, Wheeling, W. Va.

Application February 14, 1946, Serial No. 647,503

5 Claims. (Cl. 78—88)

1

This invention relates to machines for making welded tubes from flat skelp.

By methods heretofore employed, tubes of large diameter have been made by first forming the skelp into unwelded tubular form, then reheating the tube in a furnace to proper welding temperature, after which the unwelded tube is withdrawn from the furnace and passed between welding rolls and surrounding a ball of appropriate diameter held between the welding rolls upon the end of a long rod. After the tube is so formed, the ball is dropped from the rod and the latter is withdrawn from the tube. In that method it has been found that when tubes of large diameter are formed, say twelve inches and more in diameter, if the tube is very long, say in excess of twenty feet, the unwelded tube tends to collapse or the abutting or lapped edges to fall apart when it is reheated before welding. The present invention is designed to overcome those difficulties, and to enable pipe of larger diameter and greater lengths to be formed. Also when the unwelded tube is so reheated to welding temperature—a temperature which tends to cause the metal to flux impurities rolling down the sides of the tube sometimes cut peripheral ridges both inside and outside the unwelded tube—ridges which are not eliminated in the subsequent welding process. Such ridges are sometimes called "liquor marks." Furthermore, when the tube is later welded, the cinder-like impurities which formed inside the tube are caught by the ball and drawn lengthwise through the tube, scratching or cutting longitudinal channels along the interior walls of the tube, sometimes called "ball cuts." The present invention is designed to produce heavy gauge pipe of large diameter which will be free of such "liquor marks" and "ball cuts."

Another object is to provide a machine for making welded pipe or tubes of heavy gauge skelp, the weld seam of which will be free of pits or faults from scale or impurities, and of ridges, bulges and other irregularities in the pipe walls along the weld seam.

A further object of this invention is to form flat skelp into tubular form for welding with a minimum reduction in the thickness or gauge of the skelp.

Other objects and purposes will appear from this specification and from an examination of the accompanying drawings, in which—

Fig. 1 represents, in diagram, a side elevation of a mill or machine embodying my invention;

Fig. 2 is an end elevation of the first pair of rolls, showing, in cross-section, a slab of skelp gripped between the rolls;

2

Figure 12:
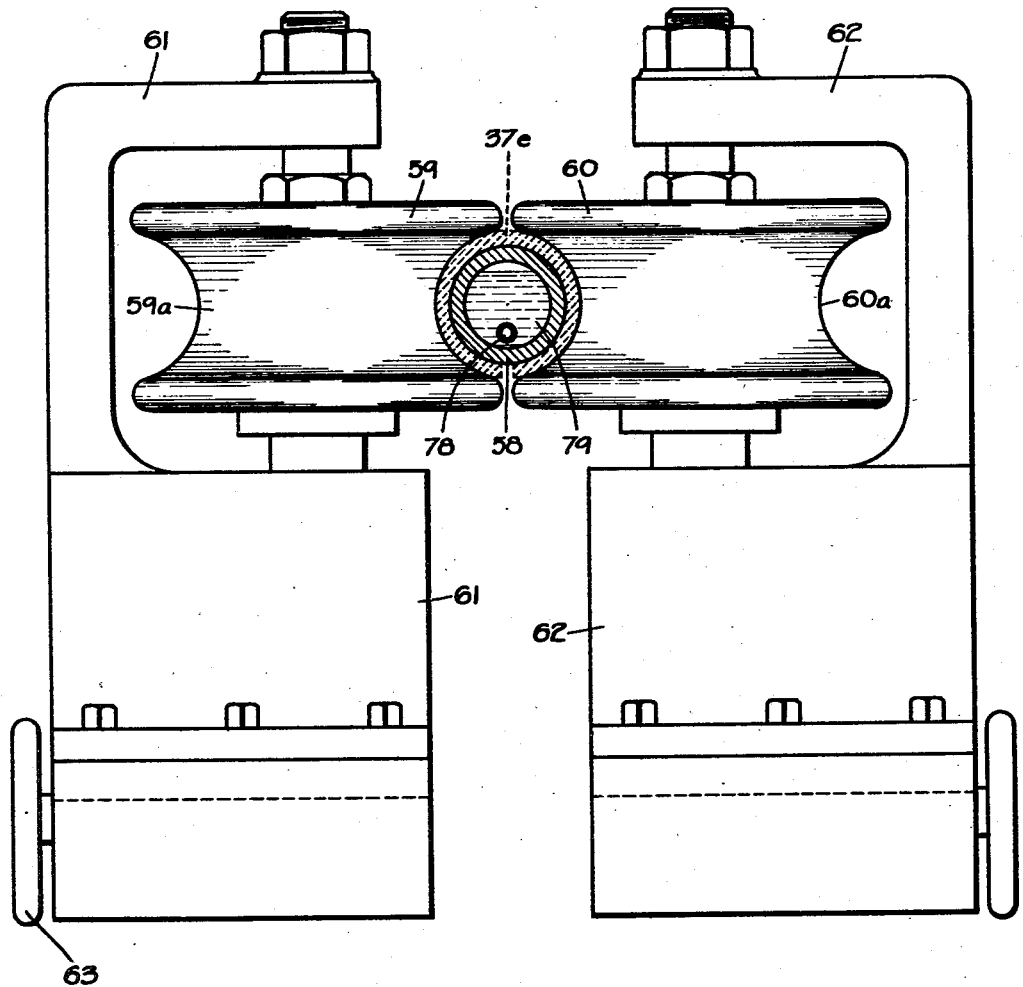
Figure 13:
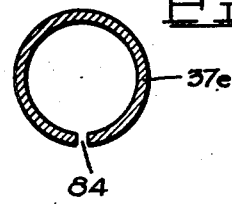
Figure 16:
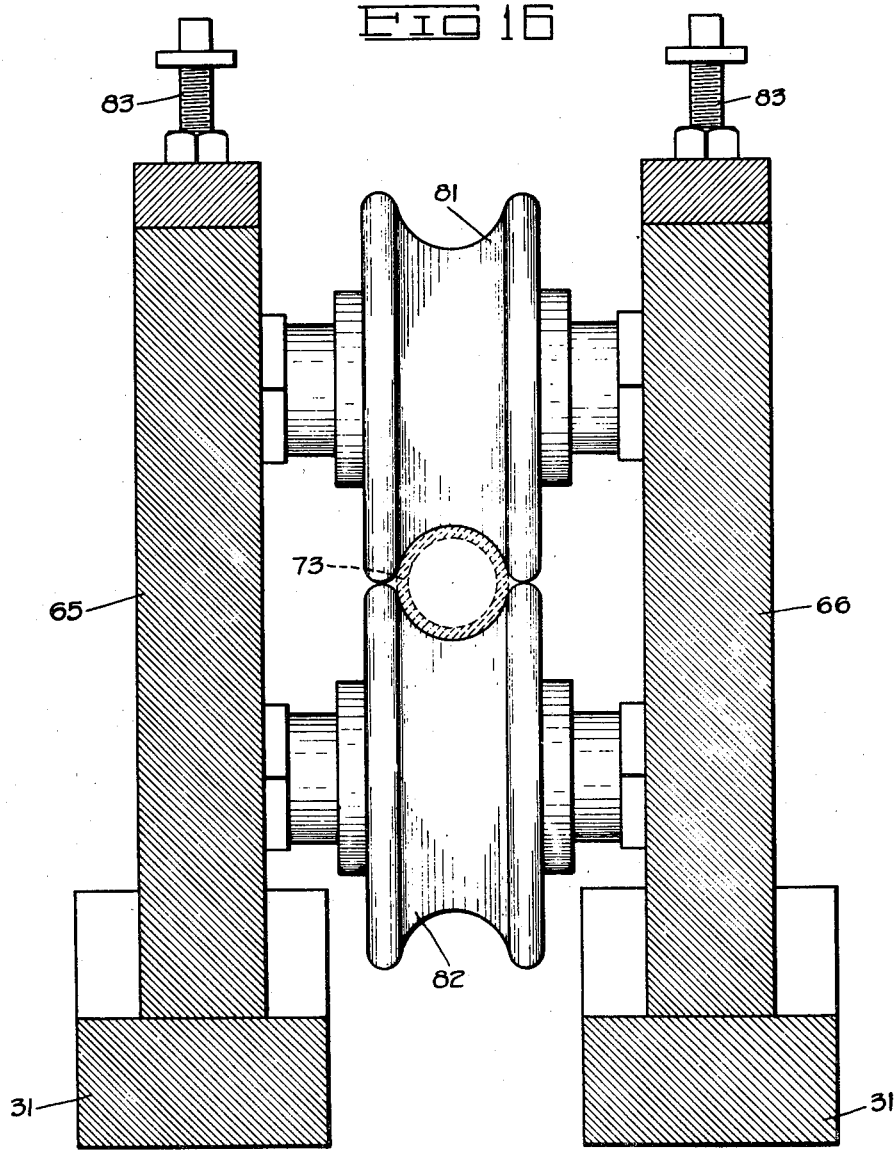
Figure 17:
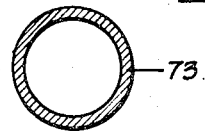

Fig. 3 shows the form of the skelp as it passes the rolls illustrated in Fig. 2;

Fig. 4 is a cross-section of the mill taken substantially on the line 4—4 of Fig. 1, and showing, in end elevation, the first forming or breakdown roll and its opposed anvil, and also showing, in dotted cross-section, the skelp in position;

Fig. 5 shows the form of the skelp as it passes the roll illustrated in Fig. 4;

Fig. 6 is a cross-section of the mill taken substantially on the line 6—6 of Fig. 1, and showing, in end elevation, the first pair of forming rolls, and also showing, in dotted cross section, the skelp in position;

Fig. 7 shows the form of the skelp as it passes the rolls illustrated in Fig. 6;

Fig. 8 is a cross-section of the mill taken substantially on the line 8—8 of Fig. 1, showing, in end elevation, the second dumb-bell roll with its opposing anvil, and also showing, in dotted cross-section, the skelp in position;

Fig. 9 is a cross-section of the skelp showing the form it assumes upon passing under the roll illustrated in Fig. 8;

Fig. 10 is a cross-section of the mill taken substantially on the line 10—10 of Fig. 1, and showing, in end elevation, the second pair of forming rolls, and also showing, in dotted cross-section, the skelp in position between said rolls;

Fig. 11 shows the form of the skelp as it passes the rolls illustrated in Fig. 10;

Fig. 12 is an end elevation of the third pair of forming rolls illustrating in cross-section a portion of the mandrel shown in Fig. 18, and also, in dotted cross-section, the skelp in position between said rolls;

Fig. 13 illustrates the form of the skelp as it passes the rolls shown in Fig. 12;

Fig. 14 is a forward end elevation of the welding rolls, showing, in cross-section, a portion of the mandrel illustrated in Fig. 18, and also showing, in dotted cross-section, the skelp in position, which has now become a tube;

Fig. 15 illustrates the form of the tube as it enters the rolls shown in Fig. 14;

Fig. 16 is an end elevation of the delivery rolls, showing the tube, in dotted cross-section, gripped between the rolls;

Fig. 17 is a cross-sectional view of the welded tube as it passes through the rolls illustrated in Fig. 16;

Fig. 18 is a side elevation of the mandrel which extends through the rolls illustrated in Figures 12 and 14;

Fig. 19 is a cross-section of the same taken through the trunnions upon which it is mounted; and Figures 20, 21 and 22 are cross-sections of said mandrel, taken respectively on the lines 20—20, 21—21 and 22—22 of Fig. 18.

In describing my invention in detail, reference will be made to said drawings by reference numerals which distinguish like parts throughout the several views.

The various parts of my invention are mounted upon a foundation 31. Standing upon said foundation at the forward end thereof is a housing 32, in which is horizontally journaled a pair of rolls 33 and 34 of ordinary cylindrical construction, designed to be geared to a driving mechanism (not shown). Likewise mounted upon the housing 32 forward of the bite of the rolls 33 and 34, by means of a pair of brackets 35 is a table 36 designed to receive the approaching skelp 37 (which has been heated to forging temperature in a furnace which is not shown) and direct it into the bite of the rolls. Mounted upon the table 36 near each side is a guide member 38 designed to center the skelp as it approaches the rolls 33 and 34. Said rolls are intended not only to assist in driving the skelp through the machine, but also to assure its being of substantially uniform thickness as it passes said rolls.

Mounted upon the foundation 31, to the rear of the housing 32, is an anvil 39, the forward horn of which approaches the surface of the roll 34 near the upper part thereof (as shown in Fig. 1 at 39a), so as to receive and support the hot skelp 37 as it emerges from the rolls 33 and 34. The skelp, at that point in its progress through this machine, and, indeed, until it has passed the rolls illustrated in Fig. 10, being very hot, would tend to sag if not supported. Journaled above the anvil 39 is a break-down or dumb-bell roll 40, so positioned with reference to the anvil 39 that, as the skelp 37a passes between it and the anvil 39, there is imparted to the skelp the inverted-channel form illustrated in Fig. 5. The upper portion of the anvil 39 upon which the hot skelp rides is preferably made hollow (as shown in dotted lines at 39b in Fig. 4) so that it can be cooled by water supplied to an opening 41 in one end of the anvil. The water escapes from the interior of the anvil through a vent 42 placed near the top of the hollow portion of the anvil. The rear horn 39c of the anvil 39 supports the skelp against sagging until it reaches the roll 43.

Said roll 43 and its companion roll 44 are journaled in a housing 45, likewise mounted upon the foundation 31 to the rear of the anvil 39. The roll 43 is formed in such a manner as to increase somewhat the depth of the channel imparted to the skelp by the dumb-bell roll 40. Its opposing roll 44 is recessed through a portion of its surface, as at 44a, so that the skelp 37b, in passing between said rolls, is gripped only by the unrecessed portion of said roll. The rolls 43 and 44 are intended to be driven by power, so as to assist in forcing the skelp through the machine in addition to imparting some additional flexion to it.

A second anvil 46 is mounted upon the foundation 31 to the rear of the rolls 43 and 44. In shape said anvil resembles the anvil 39, and it is similarly cooled by water supplied through the opening 47 and discharged through the overflow vent 48. Journaled above the anvil 46 is a second dumb-bell roll 49 which imparts some additional flexion to the skelp 37c as it slides along the upper surface of the anvil 46, so that, upon passing the roll 49, the skelp has been bent into substantially the form shown in Fig. 9.

To the rear of the anvil 46 there is mounted upon the foundation 31 a housing 50 in which is journaled a pair of rolls 51 and 52. Upon leaving the rear horn of the anvil 46, the hot skelp is gripped by the last-mentioned rolls by which it is bent into substantially the form illustrated in Fig. 11—that is, inverted-U shape. In addition to imparting to the skelp the additional flexion necessary to give it the form just mentioned, the rolls 51 and 52 are power-driven so as to assist in forcing the skelp through the machine or mill, and for the latter purpose the skelp 37d is gripped between that portion of the surface of the roll 52, indicated by the numeral 52a, and the corresponding surface of the roll 51, the roll 52 being recessed at 52b so as to leave a portion of the skelp ungripped as it passes between said rolls.

Manifestly, the skelp will be thinned throughout that portion thereof gripped by the various opposing rolls between which it passes, and, therefore, in order that a substantialy uniform thickness of the skep may be maintained, the portion of the surface of the skep gripped between the unrecessed surface of the roll 52 and its opposed roll 51 is intended to correspond with the portion of the surface of the skelp that was ungripped between rolls 43 and 44. In other words, the width of the recessed portion of the roll 44 should correspond substantially with or exceed slightly the unrecessed portion of the roll 52.

Appropriately mounted upon the foundation 31, or cast integrally with the housing 50, is a pair of bearing blocks 53 and 54 in which are received the bearing ends 55a and 55b of a shaft or trunnion 55. Keyed to the trunnion 55 by means of a spline 56 is the arm 57 of a mandrel 58, illustrated in detail in Figs. 18 to 22, inclusive. Said mandrel receives, at its forward end, the inverted-U shaped skelp, as it emerges from the rolls 50 and 51, and guides it into the bite of the vertically journaled horizontal rolls 59 and 60, which are illustrated in detail in Fig. 12. Said rolls are journaled, respectively, in housings 61 and 62, appropriately mounted upon the foundation 31 and adjustable toward and away from each other, as by means of a screw 63, in a manner well understood in the art. The peripheral surfaces of the rolls 59 and 60 are recessed into substantially semicircular channels 59a and 60a, so that the hot skelp 37e, when received therebetween, will thereby be bent around the mandrel 58, into substantially tubular form, as shown in Fig. 13. At this point in the progress of the skelp through this machine, it is preferred that there remain a slight gap between the opposite sides or edges of the skelp, as is most clearly shown at 84 in Fig. 13.

Upon emerging from the rolls 59 and 60 the skelp 37, now formed into open tubular shape with the longitudinal opening underneath, slides upon the mandrel 58 past a torch 64 appropriately positioned beneath the mandrel 58 behind the rolls 59 and 60.

Any desired fuel may be used in the torch 64, and it may be of any suitable construction. Flames from the torch are directed against the gap in the tubular skelp, so as to reheat the adjacent edges of the skelp to welding temperature, and in order that the flames may the better accomplish their purpose, the portion of the mandrel overlying the torch is recessed, is is most clearly shown at 58a in Figs. 18 and 21. Said recess enables the flames to heat the interior portion of said edges as well as the exterior. Now when skelp, especially the heavier gauges, is heated, as by the torch 64, to welding heat, there is a tendency for the metal to flux and scale, cinder or slag to form thereon. When skelp is rolled flat, the scale and other impurities are swept from the upper surface and drop from the under surface without brushing. And when such welding heat is produced in a furnace, such impurities produce, both inside and outside the table, the defects hereinbefore described. But in my invention, the reheating being underneath, the scale and any other impurities will drop away from the skelp, leaving no hindrance to the formation of a perfect weld, and resulting in no damage to other parts of the tube or pipe—objects not attainable if the seam were formed above or by the old method of reheating the unwelded tube in a furnace.

Mounted upon the foundation 31 to the rear of the torch 64, are housings 65 and 66, in which is mounted a pair of horizontally journalled welding rolls 67 and 68, shaped similar to the rolls 59 and 60. Also mounted upon the forward portion of said housings 65 and 66 are brackets 69 and 70, to which are rigidly attached bell guides 71 and 72, designed to receive the under side of the skelp 37, now formed into an unwelded tube, and direct the same between the rolls 67 and 68. The rolls 67 and 68 are so positioned with respect to each other, and their peripheries are so formed as to press the adjacent edges of the tubular skelp 37e against each other with sufficient force to form a weld, so that, upon emerging from said rolls the skelp has become a welded tube 73, as shown in Fig. 15. This forcing of the edges together to form a weld is facilitated by placing the center of the roll 67 somewhat forward of that of the roll 68, as shown in Fig. 1.

The trunnion 55a upon which the mandrel 58 is mounted, has formed integrally therewith an extension or neck 55c, upon which is mounted, by means of a feather 74, a lever 75 (most clearly shown in Figs. 19 and 1). The end of said lever is received between adjusting screws 76 and 77, mounted upon the housing 50, by means of which said lever is adjustable so as to raise or lower the rear portion of the mandrel 58, which extends between the welding rolls 67 and 68, and thus compress the seam of the skelp between the lower portion of the rear end of said mandrel and the underlying roll 68. In addition to assisting in the formation of the weld, such compression also assures the retention of a reasonably smooth outer and inner surface at the seam or weld of the tube 73, and further serves to maintain a reasonably uniform thickness of wall of the formed tube. In order that this compression action may be unhindered, and in order to assure complete and perfect abutting of the edges of the skelp along the weld seam, the portion of said mandrel which extends between said rolls 67 and 68 is recessed at 58b around substantially the upper half of its surface, as shown in Figs. 14, 18 and 22.

When this machine is in use, the mandrel 58 is constantly subjected to the heat of the hot skelp or tubing by which it is surrounded. In order to prevent its becoming too hot, it is made hollow throughout substantially its entire length, the forward end being closed by a head 58c, and the rear end by a head 58d, and water 79 or some other cooling element is forced into the hollow interior of the mandrel through a supply pipe 78 penetrating the head 58c and extending through the greater portion of the interior of the mandrel, as is best shown in dotted lines in Fig. 18. An overflow or discharge pipe or tap 80 for the cooling element 78 is also provided in the head 58c at a point near the top of the hollow portion of the mandrel, so that the mandrel will at all times be substantially full of the cooling element, and the point at which the cooling element is supplied to the interior of the mandrel being near the end opposite the discharge or overflow, assures a constant flow of the cooling element substantially throughout the entire length of the mandrel.

Journaled in the housings 65 and 66, to the rear of the rolls 67 and 68, is another pair of rolls 81 and 82 of similar shape to the rolls 67 and 68, designed to grip the pipe 73 (now completely formed and welded, as shown in Fig. 17) and deliver it upon a receiving table (not shown). Said rolls 81 and 82 also serve to assure perfect rotundity of the pipe.

Manifestly, some or all of the rolls in this machine must be power driven, but since the methods and means of applying power to rolls in machines of this kind are well known in the art, and in order to avoid confusing detail in the drawings and unnecessary prolixity in the specifications, the driving means are omitted.

Screws 83 are provided for each roll in order to regulate the pressure to be exerted by the various rolls upon the material being worked, in a manner also well known in the art, and said screws 83 are merely illustrative of devices well known.

Manifestly, pipe or tubing of any desired lengths and likewise of very heavy gauge and large diameter can be formed on this machine.

In this application I have fully described and shown in the drawings, mechanism of my invention for making welded tubes from flat skelp. In the claims which follow, I have claimed that part of my invention which relates, generally speaking, to the welding operation. In my copending divisional application, Serial No. 157,979, filed April 25, 1950, I describe and claim that part of my invention relating to the shaping of pipe, or the like, from elongated flat blanks of skelp, preparatory to the welding operation.

I claim:

1. Mechanism for making longitudinally welded pipe from stock in the form of a tube with a longitudinal open seam ready for closure by welding, comprising a substantially horizontally supported tubular mandrel shaped to fit interiorly of said stock, one end of said mandrel extending between a pair of welding rolls, said mandrel having a uniform upper stock-supporting surface in advance of said welding rolls, said upper surface supporting said stock in a sector substantially opposite the seam, and a recessed portion in said upper surface on the end of the mandrel extending between the welding rolls, and an adjustable support for said mandrel for varying the pitch thereof and consequently the amount of pressure delivered along said bearing surface, said adjustable support including a pivoted supporting arm connected to the mandrel, a lever connected to said pivoted supporting arm, and adjustable screw members bearing on opposite sides of said lever.

2. Mechanism for making longitudinally welded pipe from stock in the form of a tube with a longitudinal open seam ready for closure by welding, comprising a pair of upper and lower welding rolls, a substantially tubular mandrel shaped to fit interiorly of said stock, an adjustable support for said mandrel connected to the underside thereof, the mandrel supporting the stock with the open seam downward, one end of said mandrel extending between said pair of upper and lower welding rolls, the said upper welding roll being located in advance of said lower welding roll and tending to force the seam side of the stock away from the mandrel in advance of the point of contact of the stock with the lower welding roll.

3. Mechanism according to claim 2, the mandrel being further characterized by a recessed upper surface portion on the end of the mandrel extending beneath the upper welding roll.

4. Mechanism according to claim 2, having heating means directed against the stock seam beneath the mandrel in advance of said welding rolls, the mandrel being further characterized by having a recessed portion beneath said seam opposite said heating means.

5. Mechanism for making longitudinally welded pipe from stock in the form of a tube with a longitudinal open seam ready for closure by welding, comprising a pair of upper and lower welding rolls, a substantially tubular mandrel shaped to fit interiorly of said stock, the mandrel supporting said stock with the seam downward, one end of said mandrel extending between said pair of upper and lower welding rolls, means tiltably supporting the mandrel adjacent its opposite end including a pivotally mounted support connected to the underside thereof, locking members operatively connected to said support for adjusting the pitch of the end of said mandrel between said welding rolls and consequently the amount of pressure delivered against the lower welding roll, said upper welding roll being located in advance of said lower welding roll and tending to force the seam side of the stock away from the mandrel in advance of the point of contact of said stock with said lower welding roll.

CLYDE R. CROSON.

REFERENCES CITED

The following references are of record in the file of this patent:

UNITED STATES PATENTS

| Number | Name | Date |
| --- | --- | --- |
| 582,668 | McCrachen | May 18, 1897 |
| 611,222 | Ries | Sept. 20, 1898 |
| 1,374,145 | Free | Apr. 5, 1921 |
| 1,611,875 | Belmont | Dec. 28, 1926 |
| 1,706,393 | Fay | Mar. 26, 1929 |
| 1,735,234 | Chisholm | Nov. 12, 1929 |
| 2,339,403 | Hess | Jan. 18, 1944 |

FOREIGN PATENTS

| Number | Country | Date |
| --- | --- | --- |
| 243,858 | Great Britain | Dec. 10, 1925 |
| 804,964 | France | Aug. 17, 1936 |